US008944614B2

(12) United States Patent  (10) Patent No.: US 8,944,614 B2
Parrill  (45) Date of Patent: Feb. 3, 2015

(54) PROTECTIVE COVER FOR AN ELECTRONIC DEVICE

(75) Inventor: Matthew B. Parrill, Winchester, VA (US)

(73) Assignee: XDev, Inc., Winchester, VA (US)

( * ) Notice: Subject to any disclaimer, the term of this patent is extended or adjusted under 35 U.S.C. 154(b) by 124 days.

(21) Appl. No.: 13/457,185

(22) Filed: Apr. 26, 2012

(65) Prior Publication Data

US 2012/0275025 A1  Nov. 1, 2012

Related U.S. Application Data

(60) Provisional application No. 61/480,477, filed on Apr. 29, 2011.

(51) Int. Cl.
 *G02B 23/16* (2006.01)
 *A45C 11/38* (2006.01)
 *A45C 11/00* (2006.01)

(52) U.S. Cl.
 CPC .............. *G02B 23/16* (2013.01); *A45C 11/38* (2013.01); *A45C 11/00* (2013.01); *A45C 2011/002* (2013.01); *G06F 2200/1633* (2013.01)
 USPC ....................................................... 359/511

(58) Field of Classification Search
 CPC ........ G02B 23/16; G02B 23/20; G02B 23/22; G06F 1/16; G06F 1/1626; G06F 1/1628; B60R 1/06; H04M 1/0214; A45C 11/24; A45C 13/02
 USPC ........ 359/507, 511, 513; 361/679.02, 679.55, 361/679.56, 679.09, 679.26; 206/37, 320, 206/576; 455/575.1
 See application file for complete search history.

(56) References Cited

U.S. PATENT DOCUMENTS

| 5,850,996 | A | * | 12/1998 | Liang | .................. 248/221.11 |
| 6,646,864 | B2 | | 11/2003 | Richardson | |
| 6,955,484 | B2 | | 10/2005 | Woodman | |
| 6,967,790 | B2 | * | 11/2005 | Wei | ............................ 359/704 |
| 6,995,976 | B2 | | 2/2006 | Richardson | |
| 7,180,735 | B2 | | 2/2007 | Thomas et al. | |
| 7,230,823 | B2 | | 6/2007 | Richardson et al. | |
| 7,273,321 | B2 | | 9/2007 | Woodman | |
| 7,312,984 | B2 | | 12/2007 | Richardson et al. | |
| 7,458,736 | B2 | | 12/2008 | Woodman | |
| 7,609,512 | B2 | | 10/2009 | Richardson et al. | |
| 7,663,879 | B2 | | 2/2010 | Richardson et al. | |
| 7,680,404 | B2 | | 3/2010 | Schack et al. | |
| 7,830,628 | B2 | * | 11/2010 | Schaefer | .......................... 359/827 |
| 7,907,394 | B2 | | 3/2011 | Richardson et al. | |
| D640,679 | S | | 6/2011 | Willes et al. | |
| 7,978,425 | B2 | | 7/2011 | Christison | |
| 8,014,656 | B2 | | 9/2011 | Woodman | |
| 8,079,501 | B2 | | 12/2011 | Woodman | |

(Continued)

*Primary Examiner* — Thomas K Pham
*Assistant Examiner* — Jie Lei
(74) *Attorney, Agent, or Firm* — Matthew J. Lattig; Charter IP, LLC

(57) ABSTRACT

A protective cover for an electronic device includes a front casing and a rear removably coupled to the front casing to substantially enclose the electronic device therein. The rear casing includes a plurality of mounting slots in spaced relation thereon, each mounting slot configured to receive a mounting clip to attach the cover with electronic device to an external article. The rear casing includes an aperture which aligns with a camera lens of the electronic device within the cover. The cover includes a lens assembly removably attached in the aperture of the rear casing to extend the viewing capabilities of the camera lens.

24 Claims, 13 Drawing Sheets

(56) References Cited

U.S. PATENT DOCUMENTS

| | | |
|---|---|---|
| 2007/0280677 A1 | 12/2007 | Drake et al. |
| 2009/0080153 A1* | 3/2009 | Richardson et al. ..... 361/679.56 |
| 2009/0181729 A1 | 7/2009 | Griffin, Jr. et al. |
| 2010/0060747 A1 | 3/2010 | Woodman |
| 2011/0077061 A1* | 3/2011 | Danze et al. ............... 455/575.1 |

* cited by examiner

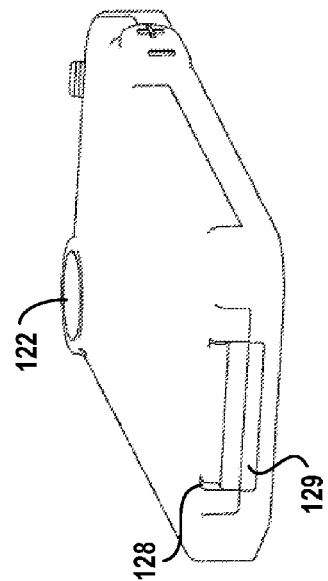
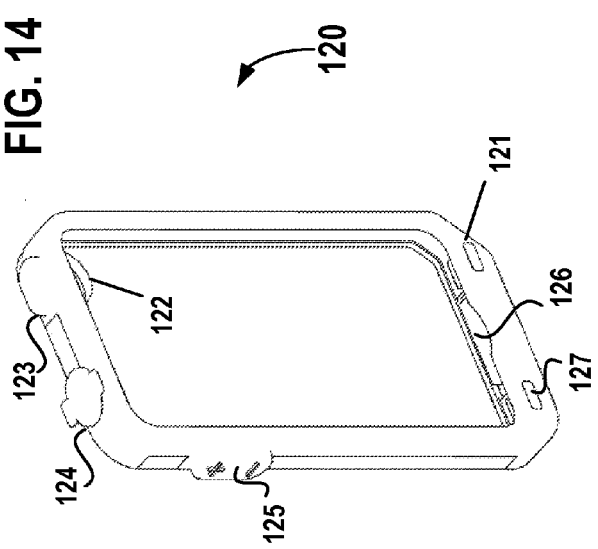
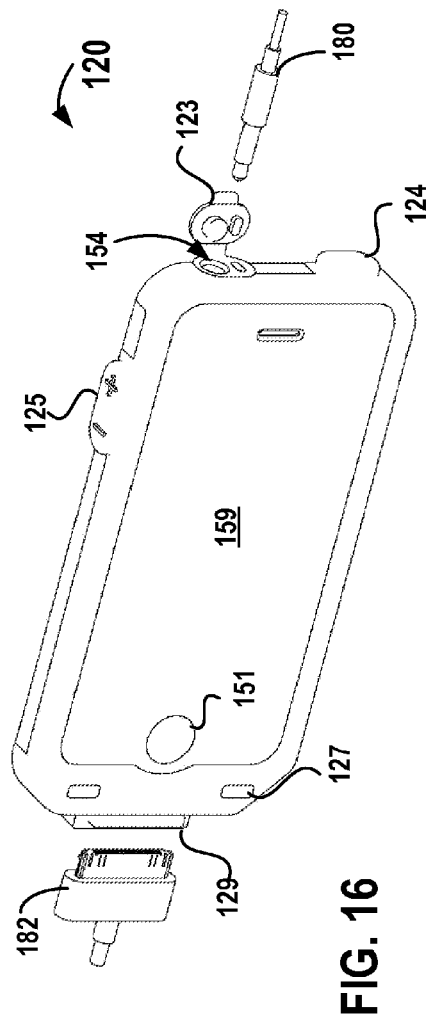

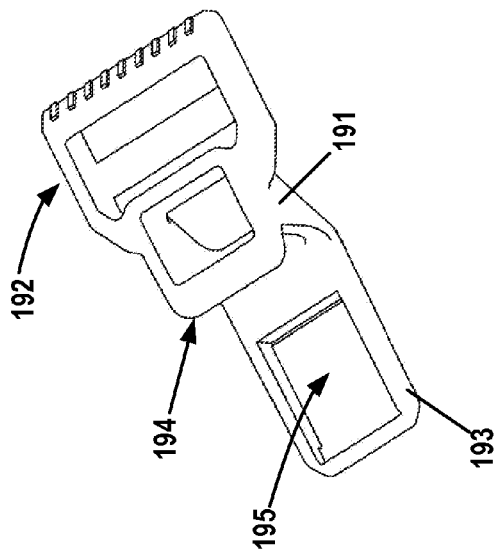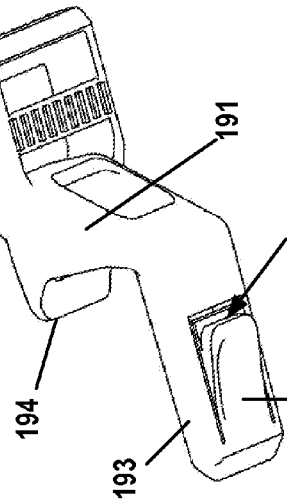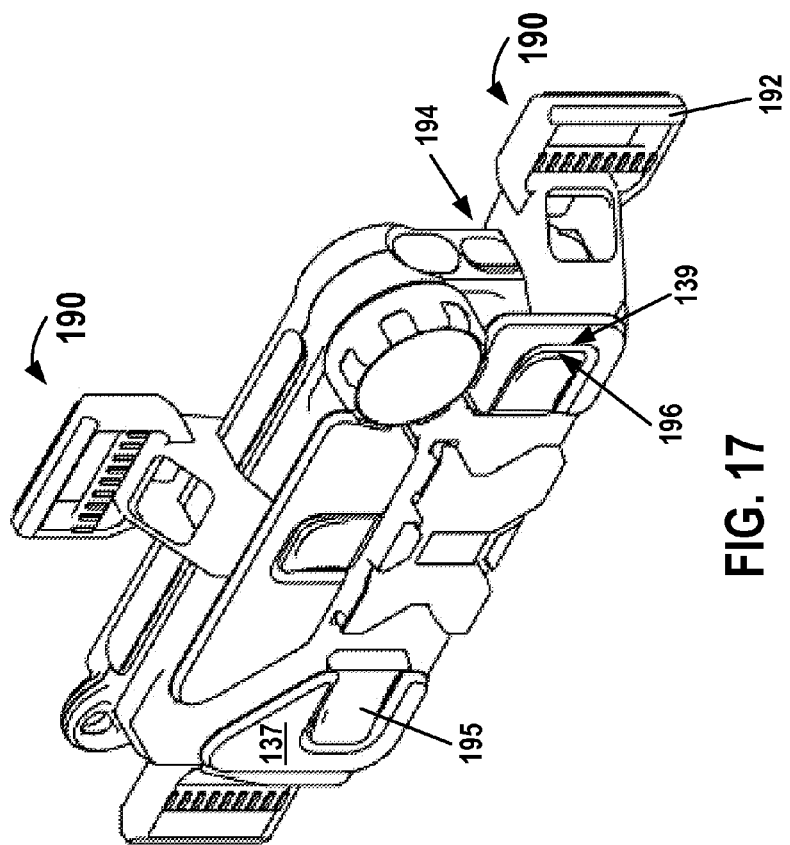

PROTECTIVE COVER FOR AN ELECTRONIC DEVICE

CROSS-REFERENCE TO RELATED APPLICATION

The present application claims the benefit under 35 U.S.C. §119(e) of U.S. Provisional Patent Application No. 61/480,477 to the inventor, filed Apr. 29, 2011, the entire contents of which is hereby incorporated by reference herein.

BACKGROUND

1. Field

Example embodiments generally relate to a protective cover for electronic devices such as smart phones.

2. Related Art

With the improvement in quality of high-end electronic devices such as digital cameras and multi-function smart phones, consumers have begun employing these devices in rigorous areas: mountain biking tails, ski-slopes, water sport regions, etc. Accordingly, as these electronic devices can be subject to shock and internal damage due to dropping/vibration, and/or internal component damage due to the entry of debris and/or moisture through open ports and/or button/switch interfaces, efforts are being directed in developing protective casings to guard against the elements in these outdoor environments. Additionally, efforts have begun in developing mounting systems for mounting these electronic devices to various types of articles used in such high-activity climates or environments.

SUMMARY

An example embodiment is directed to a protective cover for an electronic device, the electronic device including ports, actuation buttons and a camera lens on a surface thereof. The cover includes a front casing, an elastomeric boot configured for placement around a portion of the electronic device so as to serve as a water-resistant and dust-resistant barrier to protect the ports and selected ones of the actuations buttons, the boot including an aperture therein which aligns with the camera lens of the electronic device in the boot, and a rear casing removably coupled to the front casing so as to substantially enclose the boot with electronic device therebetween. The rear casing has a corner aperture which aligns with the boot aperture and the camera lens. The cover includes a lens assembly removably attached in the corner aperture of the rear casing to extend the viewing capabilities of the camera lens of the electronic device enclosed within the protective cover.

Another example embodiment is directed to a protective cover for an electronic device, the electronic device including ports, actuation buttons and a camera lens on a surface thereof. The cover includes a front casing, a rear casing removably coupled to the front casing so as to substantially enclose the electronic device therebetween in a water-resistant, dust-resistant environment. The rear casing includes a plurality of mounting slots in spaced relation thereon, each mounting slot configured to receive a mounting clip therein to attach the cover with electronic device to an external article, the rear casing having a corner aperture which aligns with the camera lens, The cover includes a lens assembly removably attached in the corner aperture of the rear casing to extend the viewing capabilities of the camera lens of the electronic device enclosed within the protective cover.

Another example embodiment is directed to a protective cover for an electronic device, the electronic device including ports, actuation buttons and a camera lens on a surface thereof. The cover includes a front casing, a rear casing removably coupled to the front casing so as to substantially enclose the electronic device therebetween in a water-resistant, dust-resistant environment, the rear casing having a corner aperture which aligns with the camera lens. The cover includes a lens cap removably attached within the corner aperture with its base adjacent the camera lens of the electronic device, the lens cap interior configured to mitigate light pollution from any flash exiting from the electronic device in conjunction with a camera function thereof.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 14 is an angled front perspective view of the boot to illustrate interior features thereof.

FIG. 15 is a bottom perspective view of the bottom to illustrate the pivotable hinge in more detail.

FIG. 16 is a perspective view of the boot without front and back case parts to show connective relationships to the electronic device therein.

FIG. 17 is a perspective rear view of the cover showing one embodiment of mounting clips attached thereto.

FIG. 18 is a top perspective view of the mounting clip of FIG. 17 to show additional detail thereof.

FIG. 19 is a side perspective view of the mounting clip of FIG. 17 to show additional detail thereof.

DETAILED DESCRIPTION

Figure 1:
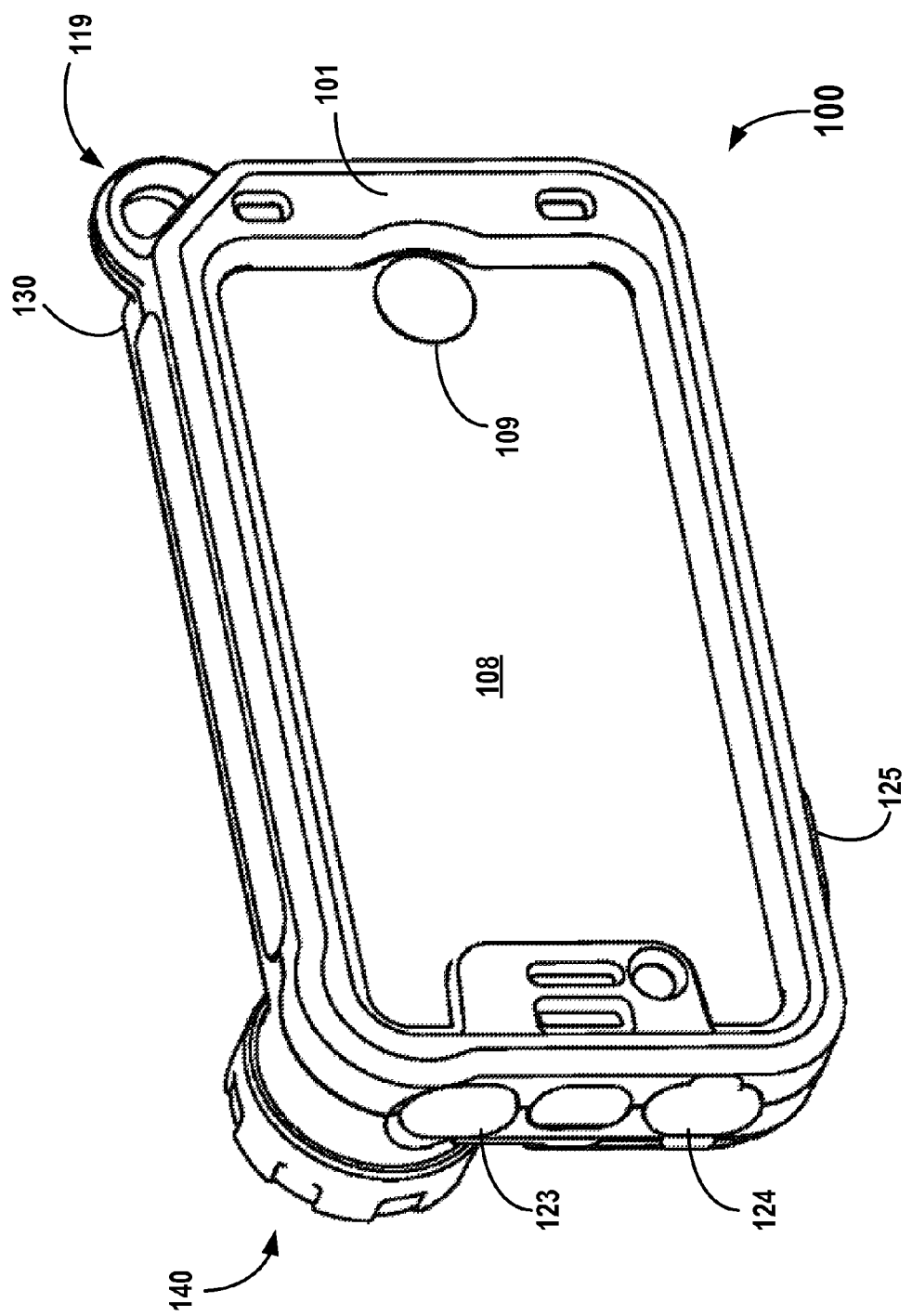
FIG. 1 is a front perspective view of a protective cover for an electronic device according to an example embodiment.

As to be described hereafter, an example embodiment is directed to a protective cover for an electronic device. The electronic device may be embodied as a smart phone having a camera and/or video recording function with a lens therein, although the cover described hereafter could be adapted to a tablet style smart device having a camera and/or video recording function with lens.

As to be shown and described more fully hereafter, the cover includes casing parts which snap fit together in sealed relation to secure the electronic device within an enclosure, providing a design that is shock absorbent, dust-resistant and water-resistant. The electronic device itself is partially sheathed within an isolation liner or boot within the enclosure formed by the casing parts. The boot has shock-absorbing properties and seals open ports and actuation buttons in the electronic device from dust and moisture, independent of the casing parts.

One of the casing parts is adapted to include a lens assembly that is configured to accommodate interchangeable lenses that can be used with the camera function of the internally housed electronic device. The lens assembly is configured to extend or modify the viewing capabilities, such as the viewing angle or other characteristics of the electronic device within the cover. In another embodiment, a lens cap serves as a light pipe to transport light from a built-in flash of the electronic device to the subject being captured by the camera lens, and also to mitigate light pollution from the flash set off by the camera function of the electronic device.

Additionally, one of the casing parts includes waterproof mesh screening material and screen structure built into the casing part to provide waterproof and dustproof functions for microphones and speakers of the electronic device. Further, the boot includes attached, pivotable, flexible tabs which seal jack and charging/USB ports but provide access thereto for use within the protective cover, as well as bumpout sealed control pads that are integrated into the boot along a periphery thereof. The control pad align with power and volume power controls of the electronic device so as to permit use thereof, while retaining water-resistant and dust-resistant integrity of the electronic device within the enclosure formed between the casing parts. Moreover, one of the casing parts has an open face sealed by a protective film which permits the user to operate a touch screen display of the electronic device within the cover.

Referring now to FIGS. 1-8, there is shown a protective cover 100 which includes a front casing part 101 and a rear casing part 130 coupled thereto. The cover 100 is configured to sealingly enclose an electronic device therein. As shown best in FIGS. 1 and 5, the front casing part 101 retains a clear protective touch-screen film 108 that permits the user to access and use a touch screen of the enclosed electronic device. The film 108 includes a "home" label 109 (which may be also embodied as a feature, indent or indicia) that corresponds to and aligns with a home screen button or key on the electronic device.

Figure 5:
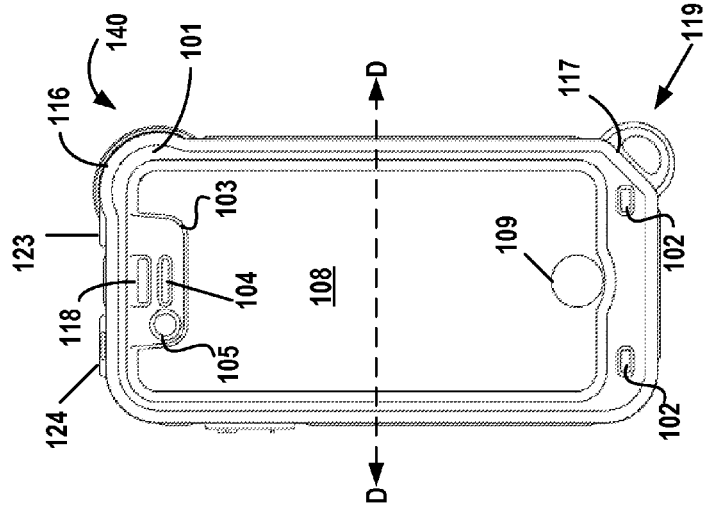
FIG. 5 is a front plan view of the cover with shown in FIG. 1.

Cover 100 includes two rounded corners on the left upper and lower corners. As best shown in FIG. 5, cover 100 also includes an oversized or enlarged semi-circular upper right corner 116 that mimics the profile of the lens assembly 140, and a lower right truncated corner 117 to which are connected a lanyard loop 119. The loop 119 may be configured to receive a rubber tether therethrough for attachment to an article such as a person, backpack, etc., and or for attachment to a carabiner which in turn is attached to a remote article or structure.

In an example, the electronic device may be embodied as a smart phone. For purposes of explanation hereafter, the electronic device described in connection with the example embodiments shall be referred to as a smart phone ("phone 150"), it being understood that the electronic device within cover 100 could be a tablet or portable music player with camera/video function, or other electronic device having a camera/video function.

Figure 3:
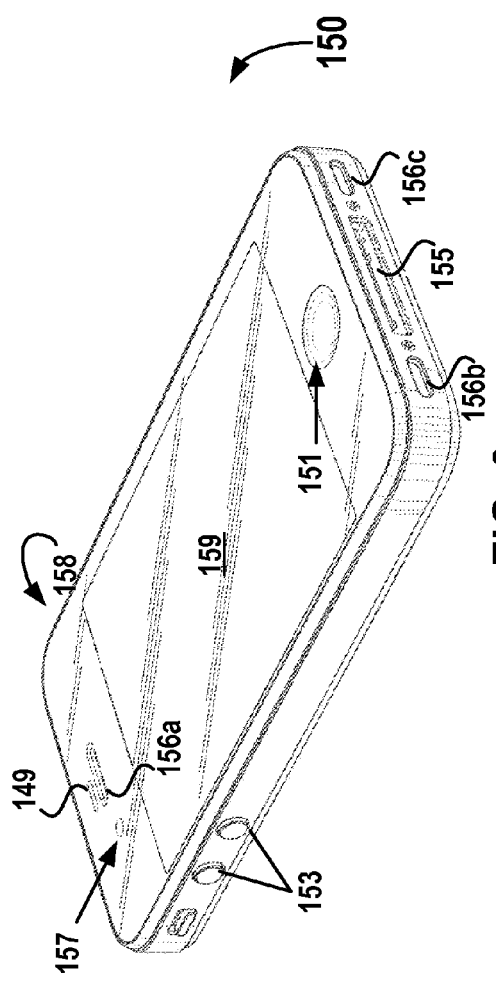
FIG. 3 is a bottom front perspective view of an example electronic device protectable by and usable within the cover.
Figure 4:
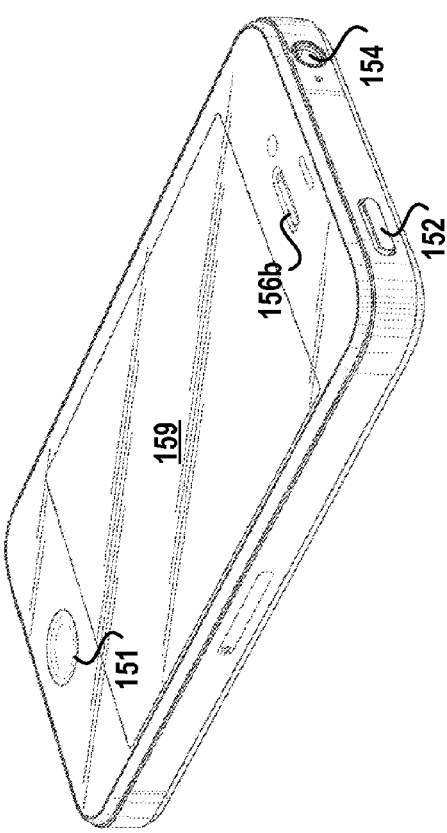
FIG. 4 is a top front perspective view of the electronic device of FIG. 3.

As shown in FIGS. 3 and 4, the smart phone described as the example electronic device has a profile of the iPhone® by Apple®, Inc. However, the example embodiments are not so limited to this smart phone profile. The cover 100 and associate structure could be adapted to any style smart phone currently on the market or in development, as the principles described hereafter in connection with the protective cover 100 are applicable to any smart phone and/or tablet design.

As shown in FIGS. 3 and 4, phone 150 includes a home button 151 that can be accessed from outside cover 100 by depressing home label 109 on protective film 108. Applications on phone touch screen 159 can be accessed within cover 100 simply by touching the protective film 108. Power button 152 and the volume +/− control buttons 153 are also usable within the cover 100 via control pads 123 and 125 on cover 100, as will be shown in more detail hereafter. Accordingly, a user has full use of his/her phone within the cover 100.

Figure 8:
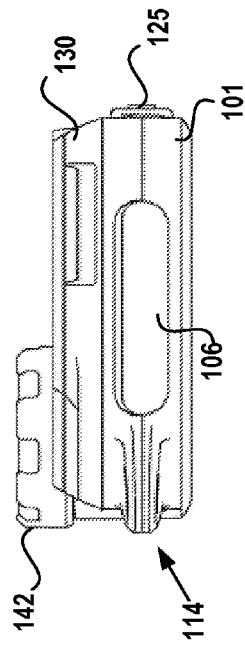
FIG. 8 is a bottom plan view of the cover shown in FIG. 1.

Many smart phones includes proximity sensors that power down the touch screen when it senses a user placing the phone next to their person to take a call. According, phone 150 may also include a proximity sensor 149 which de-energizes the touch screen 159 when it senses the user placing the phone 150 against their ear to take a call. A user also has access to mini-jack port 154 for headphone use (via flap 124 on cover 100) and charging port 155, as will be shown in more detail hereafter. The mini-jack port 154, charging port 155, ear speaker 156a, microphone 156b and phone speaker 156c are all sealed within a water-resistant and dustproof environment of cover 100 by the use of an isolation liner, or "boot", and/or additionally by waterproof and dustproof mesh screening material, as to be shown in more detail hereafter. Access to the mini-jack port 154 is possible with the phone 150 within cover 100, access to the charging port 155 is not, as shown in FIG. 8 for example, where a frame portion 106 of front casing part 101 seals access to the charging port 155. However, the phone 150 can be charged within the boot, once removed from the inside of cover 100. Element 157 denotes a user-facing camera and element 158 denotes the location of a camera lens of the phone 150; the viewing capabilities and/or angle of camera lens 158 may be extended or modified with the lens assembly 140 of cover 100.

Figure 7:
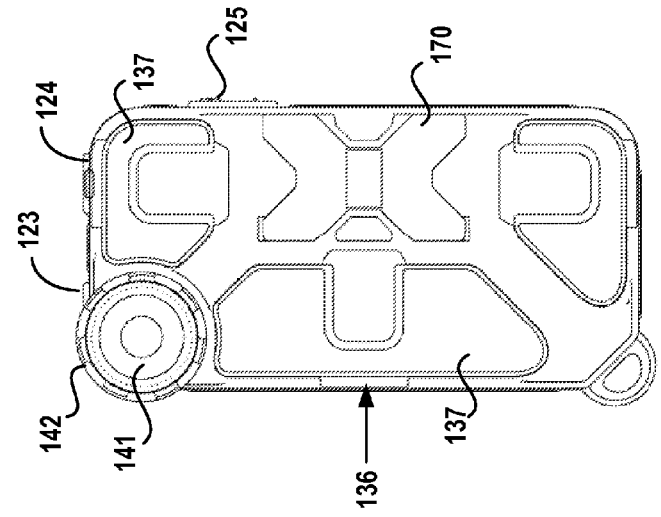
FIG. 7 is a rear plan view of the cover shown in FIG. 1.
Figure 6:
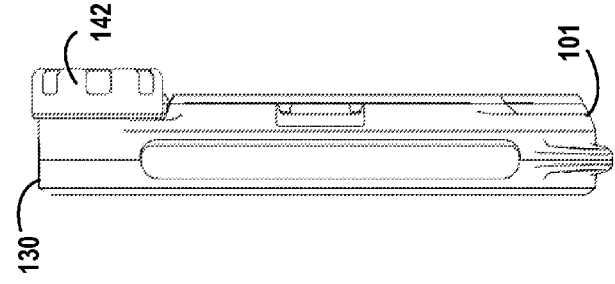
FIG. 6 is a right-side elevational view of the cover shown in FIG. 1.

The rear casing part 130 includes the aforementioned lens assembly 140, which is removably attached thereto. The lens assembly 140 includes a removable lens cap 142 which encloses a lens 141, as best shown in FIG. 7. Lens 141 may be any of a plurality of interchangeable lenses that can be used with the camera/video function of the phone 150 so as to extend and/or modify the viewing angle of the phone 150 when it is secured within the cover 100. The location of the lens assembly 140 on cover 100 is so as to align with the lens component on the electronic device (lens 158 of phone 150). As to be shown in later figures, each of the boot (not shown), and rear casing part 130 have apertures therein which align with the lens 158 of the phone 150 and lens assembly 140.

Figure 2:
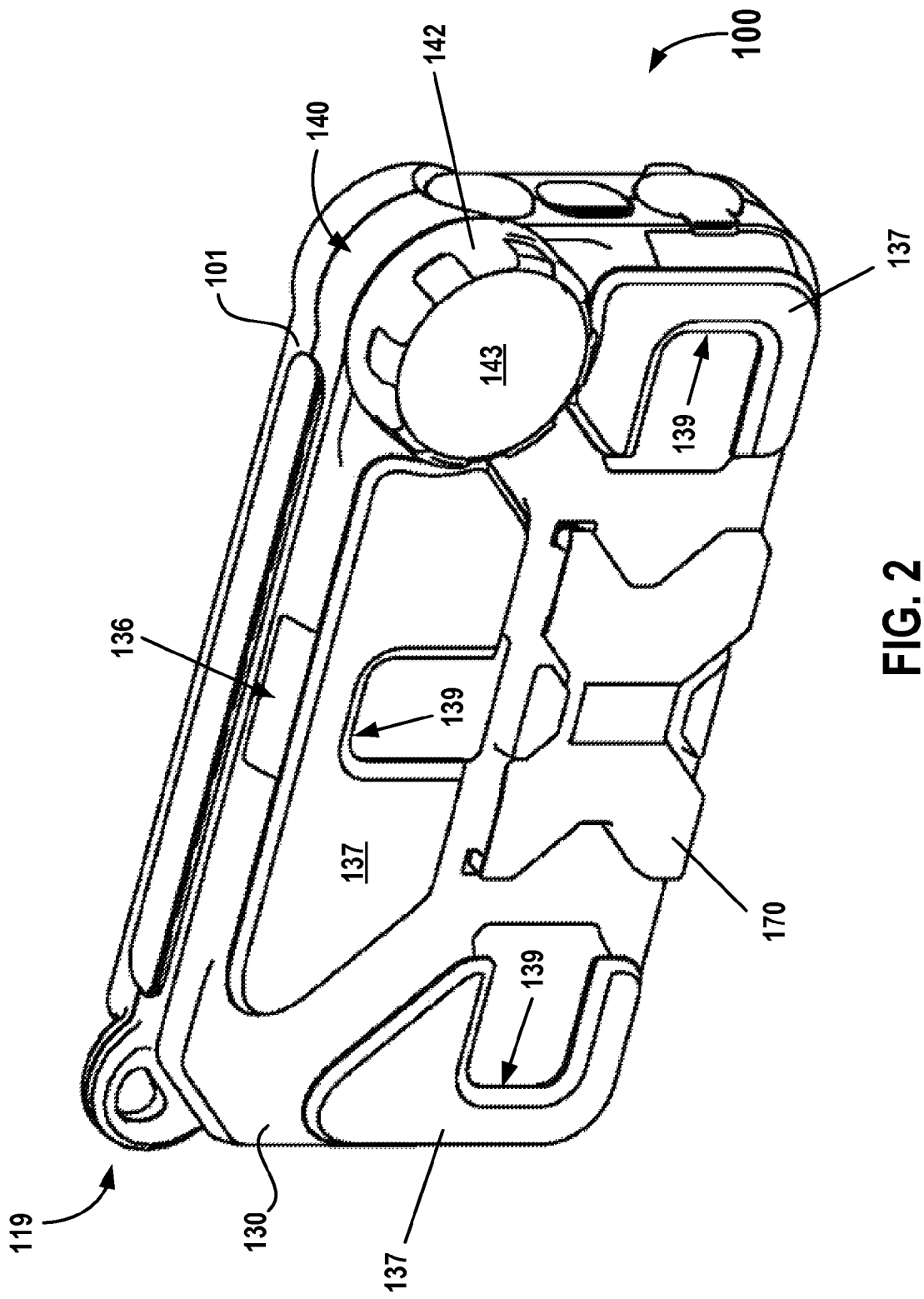
FIG. 2 is a rear perspective view of the cover shown in FIG. 1.

As shown in FIGS. 2 and 7, the rear casing part 130 further includes a plurality of plates 137 which are adapted to capture mounting clips (not shown), as to be described in further detail hereafter, and a central kickstand 170 that can deploy outward so that the cover 100 can be supported thereon and angled for viewing. As shown best in FIG. 5, the front casing part 101 includes microphone/speaker apertures 102 which cover an internal mesh screen within the underside of the front casing part 101. The apertures 102 also align with the lower microphone 156b and phone speaker 156c of phone 150 within the cover 100.

There is also a front upper tab part 103 which has a top ear speaker aperture 104 and user-facing camera window 105. Ear speaker aperture 104 covers an internal mesh screen within the underside of the front casing part 101 and is designed to align with the ear speaker 156b of phone 150 when it is secured within cover 150. Similarly, the user-facing camera 105 is aligned with the user-facing camera 157 on phone 150 so that it may be usable there through. Further, there is provided a proximity sensor port 118 which ensures that the proximity sensor 149 on phone 150 remains operable inside cover 100. If this port 118 was absent, the sensor 149 could not detect an incoming call to de-energize the touch screen 159, leading to dropped calls.

Figure 9:
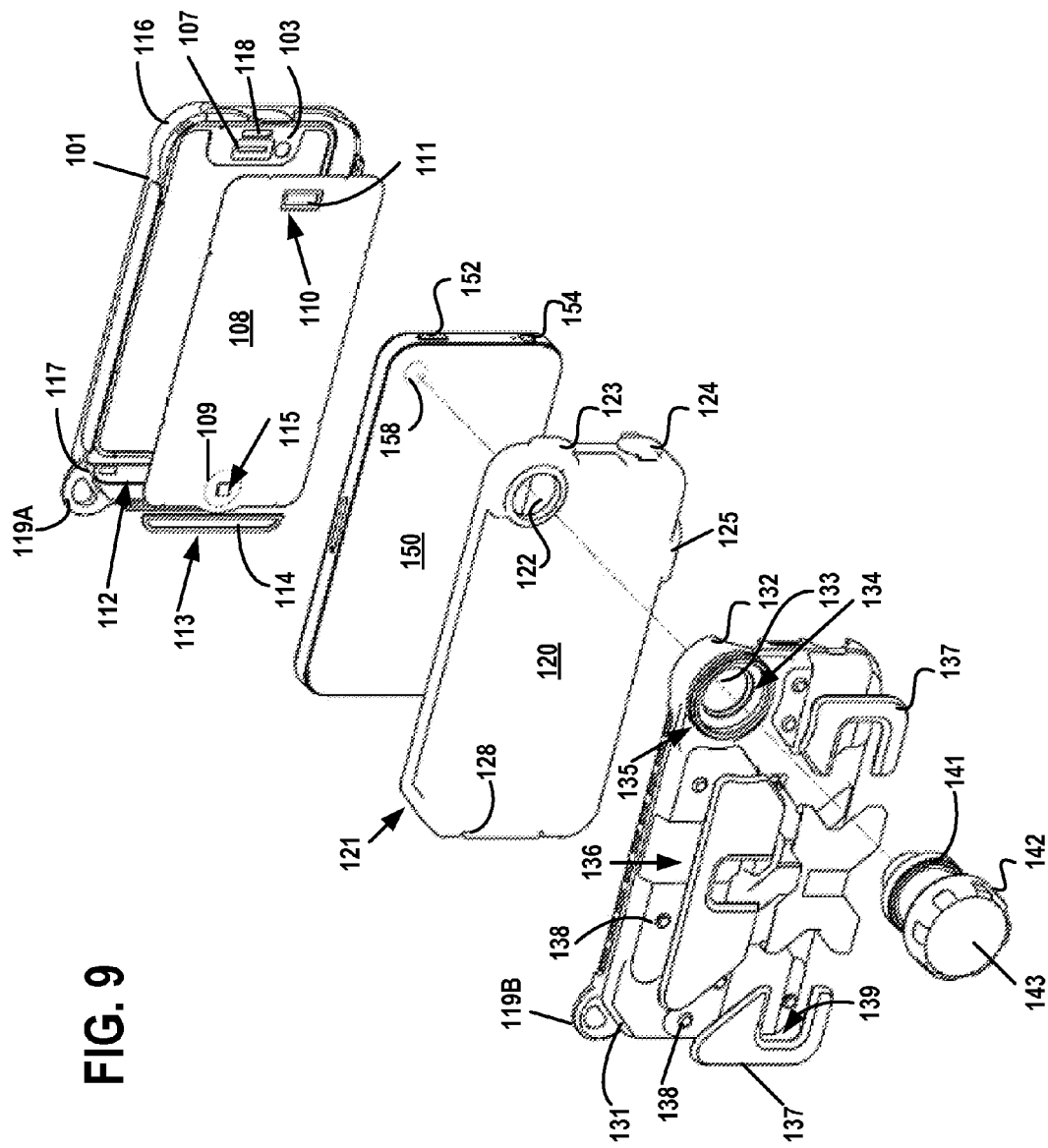
FIG. 9 is an exploded parts illustration of the cover to show constituent components in more detail.
Figure 10:
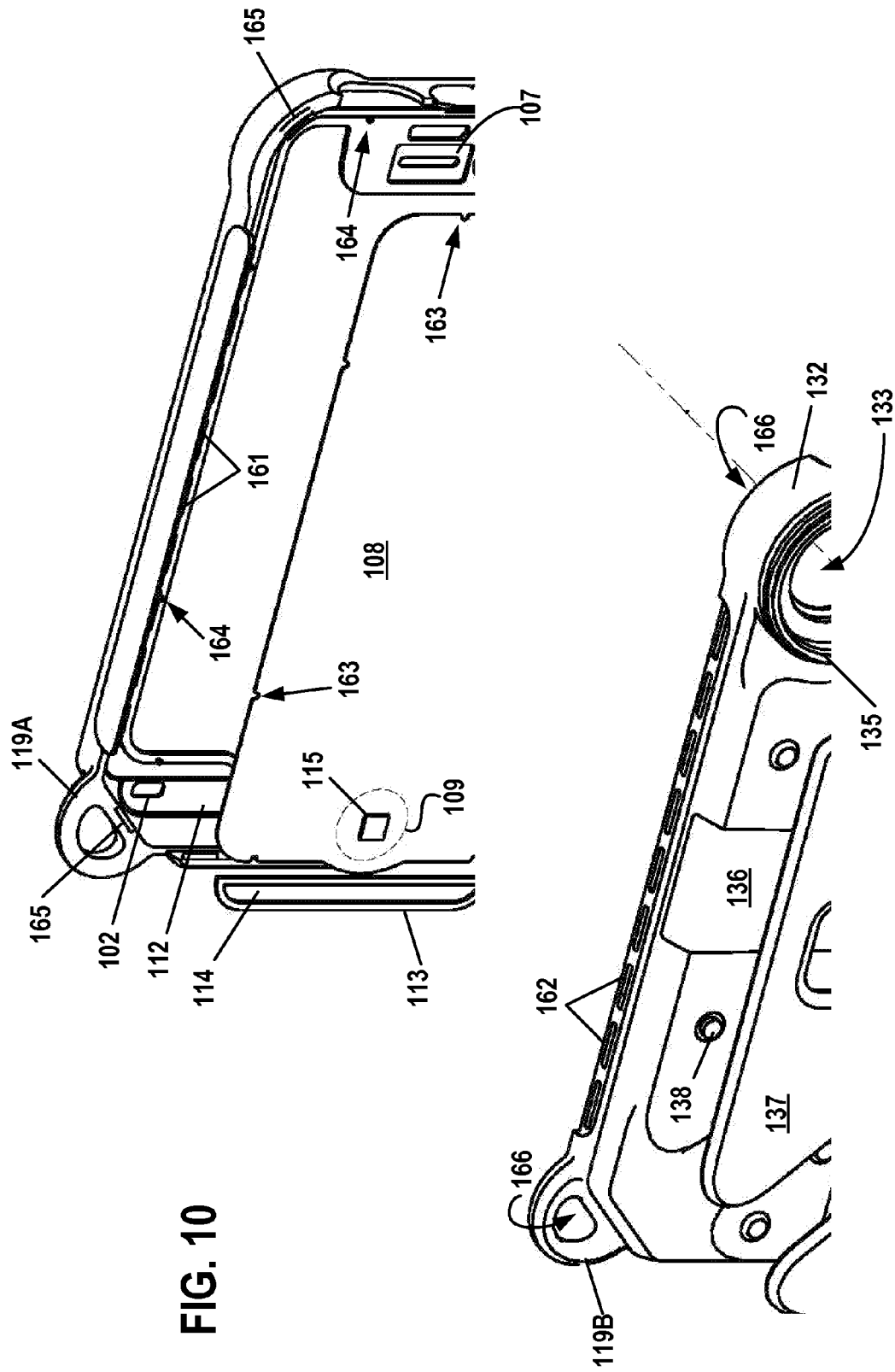
FIG. 10 is a partial enlarged view of the front and rear casing parts to illustrating connective elements for engagement thereof in more detail.
Figure 12:
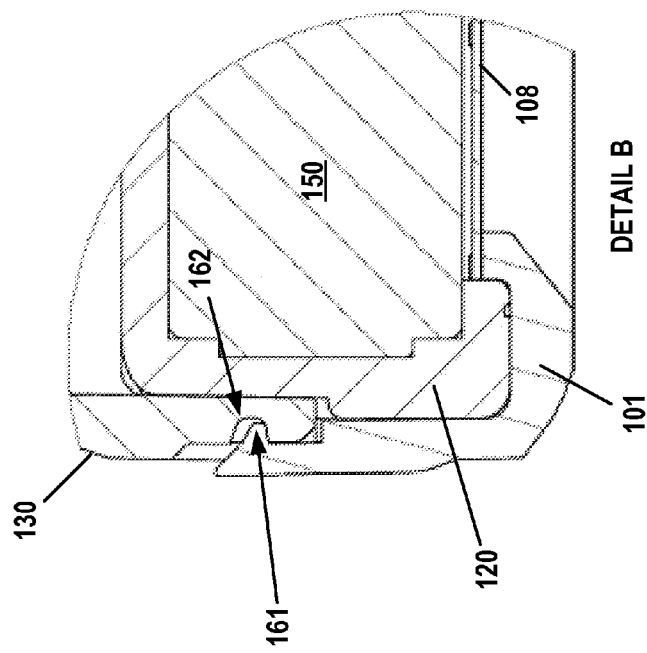
FIG. 12 is an enlarged view of encircled detail B from FIG. 11 to illustrate connections between the casing parts around the electronic device.
Figure 11:
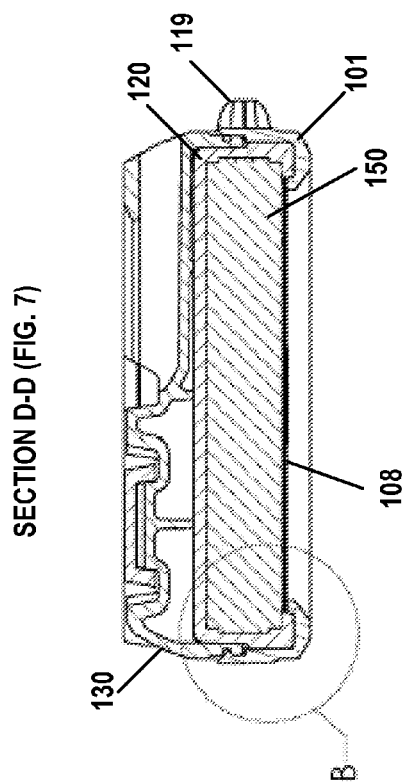
FIG. 11 is a sectional view taken along line D-D in FIG. 7.

FIG. 9 is an exploded parts illustration of the cover to show constituent components in more detail; FIG. 10 is a partial enlarged view of the front and rear casing parts to illustrating connective elements for engagement thereof; FIG. 11 is a sectional view taken along line D-D in FIG. 5; and FIG. 12 is an enlarged view of encircled detail B from FIG. 11 to illustrate connections between the casing parts around the electronic device.

In FIG. 9, the tab part 103 of front casing part 101 includes a depression 107 configured to receive an ear speaker mesh screen frame 110 which bound a waterproof and dustproof ear speaker mesh screen 111. This mesh screen 111 seals the ear speaker 156a of the phone 150 within the cover 101. Similarly, a depression 112 is formed in the lower underside end of front casing part 101 and dimensioned to receive a second mesh screen frame 113 which bounds a waterproof and dustproof mic/phone speaker mesh screen 114. This mesh screen 114 seals the microphone 156b and phone speaker 156c of phone 150.

Additionally, the protective film 108 is shown with the home label 109 thereon, which aligns with the home button 151 on phone 150. The home label 109 may optionally include a home energy director 115 to ensure positive engagement with the home button 151.

The phone 150 is sheathed with the boot 120. The boot 120 includes a truncated corner 121, similar to truncated corner 117 of front casing part 101 and truncated corner 131 of rear casing part 130, to account for the two lanyard loop parts 119A/B which snap fit together to form lanyard loop 119.

Boot 120 includes bumpout control pads 123 and 125 which cover the power button 152 and volume control buttons 153 (not shown) of phone 150 and permit use by a user thereof. These portions of the boot 120 are accessible between the connected front and rear casing parts 101, 130, as well as pivotable flap 124 which provides access to mini-jack port 154 for headphone usage. The bottom end of boot 120 has a hinge 128 that provides access to charging port 155; this shall be shown in more detail hereafter.

Rear casing part 130 includes an integral upper corner lens holder 132 having a corner aperture 133 therein that aligns with an aperture 122 in the boot 120 and the camera lens 158 of the phone 150. The lens holder 132 aperture 133 includes an o-ring 134 for sealing and is configured to receive the lens 141 of the lens assembly 140. Lens 141 may be interchangeable between a variety of different lenses types, such as a fish eye lens, a wide angle, lens, a telephoto type lens, a compound lens, a non-refracting lens, etc. The lens cap 142 is attached to the outside of lens holder 132, which includes external threads 135 thereon that couple to internal threads (not shown) within the end cap 142. The end cap 142 may include an optical window 143.

In one example, the outer surface of rear casing part 130 includes a plurality (here shown as a set of three) plates 137 which overlay channels 136 so as to create mounting slots or mounting points of attachment for mounting clips. The outer surface of the rear casing part 130 includes a plurality of alignment guide bosses 138 which mate with depressions (not shown) in the rear surfaces of each plate 137 in snap fit relation so as to form a mounting slot between each plate 137 and corresponding channel 136. Each plate 137 further has a cutout 139 formed therein. The cutout 139 permits access to a mounting clip foot to permit release of the clip from the cover 100, as will be shown in more detail hereafter.

An explanation of how the boot 120, front and rear casing parts 101, 130 engage to seal the phone 150 therein is described with reference to FIGS. 10-12. To secure the phone 150 within the cover 100, the phone 150 is placed within the boot 120, and the boot 120 with phone 150 therein is placed within the rear casing part 130. The front casing part 101 includes the protective film 108 and mesh screens 110, 114 secured therein. Specifically, the mesh screen frames 110, 113 are friction fit held within depressions 107 and 112, and the film 108 is secured by pins 164 engaging at cutouts 163.

The periphery (all sides) of the front casing part 101 has a plurality of spaced raised ridges or tabs 161 that engage a corresponding plurality of spaced slots 162 along the periphery of the rear casing part, as best shown in FIG. 10. To ensure proper alignment, the corners of the front casing part 101 include alignment tabs 165 that meet up with corresponding corner slots 166 (not shown) on the rear casing part 130. The Detail B of FIG. 12 shows the proper engagement of tab 161 in slot 162, with boot 120 compressing any open space between the casing parts 101, 130 so as to provide a waterproof and dustproof environment around phone 150.

Figure 13:
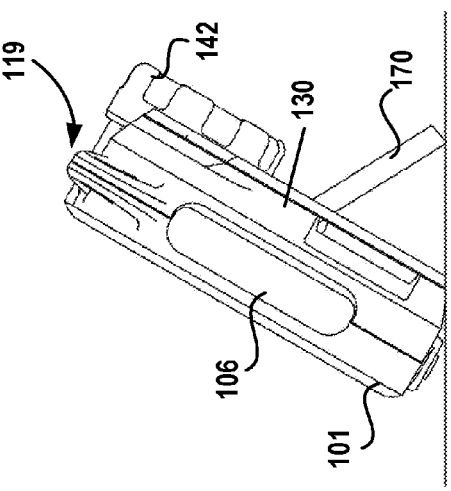
FIG. 13 is an angled bottom plan view illustrating the kickstand in a deployed condition.

FIG. 13 is an angled bottom plan view illustrating the kickstand in a deployed condition. The kickstand 170 is configured to rotate out at an angle between about 30-45 degrees. The kickstand 170 permits the cover 100 to be angled for viewing. For example, kickstand 170 permits cover 100 to set on a surface at a tilted or angled orientation to enable the user or viewer to view the touch screen 159 of phone 150 in a hands-free manner.

The front and rear casing parts 101, 130 may be formed by an injection molding process from a high impact plastic, such as Acrylonitrile Butadiene Styrene (ABS), which is an easily machined, tough, low cost rigid thermoplastic material with high impact strength, and may be a desirable material for turning, drilling, milling, sawing, die-cutting, shearing, etc. Virgin ABS may be mixed with a plastic regrind of ABS or another lightweight, durable plastic material. ABS is merely an example material, equivalent materials may include various thermoplastic and thermoset materials, such as talc-filled polypropylene, high strength polycarbonates such as GE Lexan®, or blended plastics. In another embodiment, one or more individual components or accessory parts may be otherwise forged or shaped from metal or metal alloy-based materials.

The boot 120 may be injection-molded elastomeric, rubber, urethane or like material, one example being silicon, and/or a silicon or elastomeric-type material with or without UV inhibitors, combinations of these materials, etc. The protective film 108 may be composed of polyester, Mylar®, a anti-glare polyester, anti-glare Mylar®, combinations of these materials, or any other like material with or without anti-glare properties. The lens cap 142 in one example may be an injection-molded polycarbonate, although other materials such as optical glass, artificial sapphire, etc. may be used.

The various constituent components of cover 100 accordingly may be formed by an injection molded process. Example processes may include over-molding, insert molding, co-injection molding, etc. The forming process for the constituent components of cover 100 is not limited to injection molding, as other manufacturing methods known to one having ordinary skill in the art, such as a compression process and/or an extrusion process may be used to form the cover 100.

FIG. 14 is an angled front perspective view of the boot to illustrate interior features thereof; FIG. 15 is a bottom perspective view of the bottom to illustrate the pivotable hinge in more detail; and FIG. 16 is a perspective view of the boot without front and back case parts to show connective relationships to the electronic device therein.

Referring to FIGS. 14-16, control pads 123 and 125 can be more clearly seen, as can flap 124, which in FIG. 16 is open to permit a headphone jack 180 access to mini-jack port 154. Additionally, apertures 127 mimic the locations of the microphone 156b and phone speaker 156c locations on phone 150; these are overlain by mesh screen 114. FIG. 14 shows the interior insert 126 of flexible flap 129, which seals charging port 155 when the phone 150 is sheathed within boot 120. In order to charge phone 150, the boot 120 with phone 150 is removed from the cover 100, the flap 129 is pivoted at hinge 128 to pull the insert 126 out of the port 155, and a charger connector 182 is inserted into port 155, as shown in FIG. 16.

FIG. 17 is a perspective rear view of the cover showing one embodiment of mounting clips attached thereto; FIG. 18 is a top perspective view of the mounting clip of FIG. 17 to show additional detail thereof, and FIG. 19 is a side perspective view of the mounting clip of FIG. 17 to show additional detail thereof. Referring to FIGS. 17-19, cover 100 may be configured so as to have at a plurality of separate mounting points of attachment for mounting clips 190, at least three are shown in FIG. 17. Each mounting clip 190 has a body 191 with an external connector piece 192. However, there is a common foot 193 structure for each mounting clip that connects to cover 100, so that it is received at a mounting location (e.g., mounting slot) formed between the plate 137 and channel 136. FIGS. 18 and 19 also show a lock tab 194 that grasps the front casing part 101 for stability and helps prevent inadvertent opening of cover 100.

To secure a mounting clip 190 into a mounting location on cover 100, which in an example is a mounting slot formed between a channel 136 and plate 137, the foot 193 end is inserted into the slot. The foot 193 includes a flexible tongue 195 which includes a catch 196 on an underside thereof. The catch 196 levers against the inner middle cutout 139 formed in a corresponding plate 137, as shown in FIG. 17. In concert with the lock tab 194 secured against the front casing part 101, this secures the mounting clip 101 in place on cover 100. To remove the clip 190, a user depresses the tongue 195 inward into the channel 136 to disengage the catch 196 from the cutout 139 on plate 137, and withdrawals the clip 190 from the slot.

In an example, the clips 190 shown in FIGS. 17-19 may be used with 1" strap webbing for a chest harness that holds the cover 100 with phone 150 therein. However, cover 100 may be adapted for multiple points of mounting clips to enable cover 100 to be mounted on any of a human appendage, a helmet, an animal, as part of an articulated chest mount, bar mount, belt clip, tripod, on filming handles to replicate a camcorder-type experience, as an adapter permitting mounting to a suction cup, on a bicycle or motorcycle, on other types of wheeled vehicles such as cars, go carts, golf carts, on a weapon, and on various types of sporting equipment such as skis, snowboards, kayaks, canoes, and surfboards.

Figure 21:
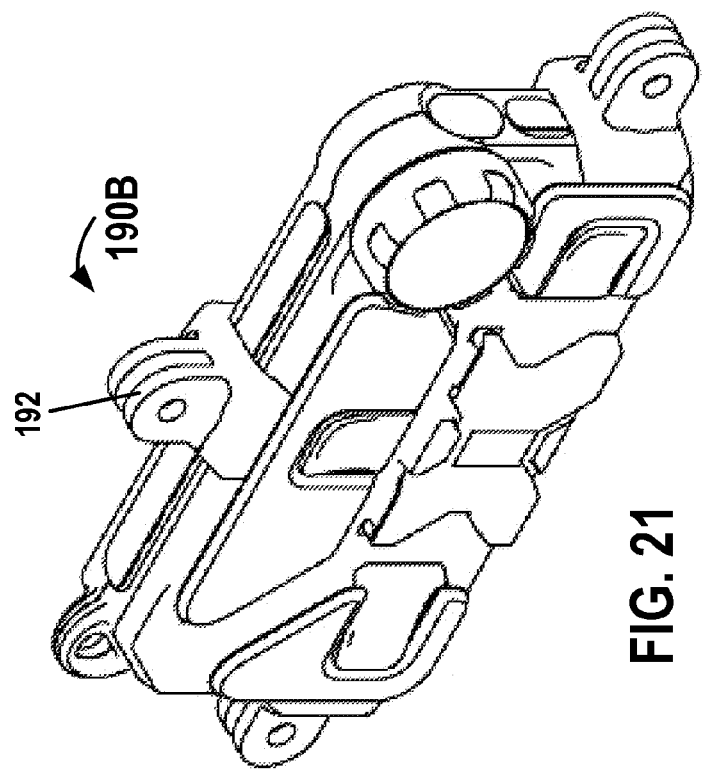
FIG. 21 is a perspective rear view of the cover showing another embodiment of mounting clips attached thereto.
Figure 20:
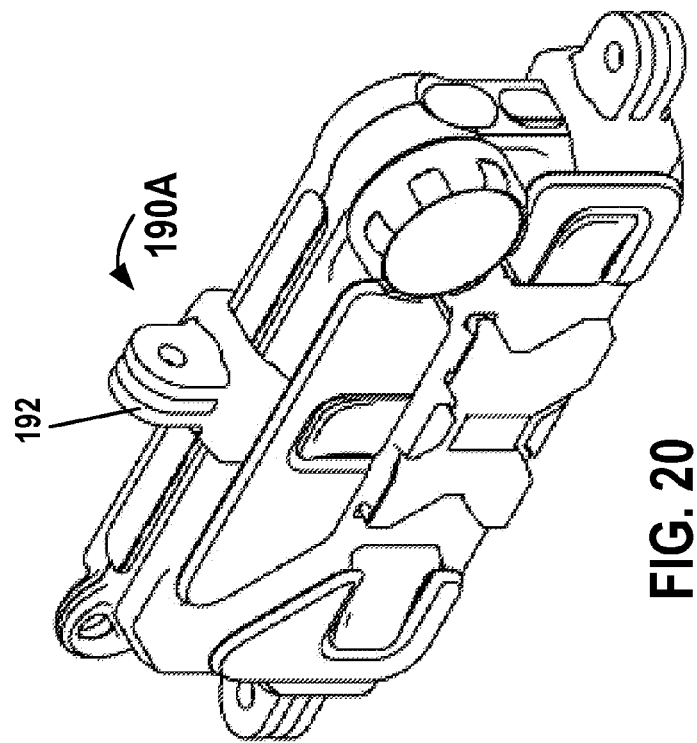
FIG. 20 is a perspective rear view of the cover showing another embodiment of mounting clips attached thereto.

FIGS. 20 to 23 are perspective rear views of the cover showing additional, different embodiments of mounting clips attached thereto. FIGS. 20 and 21 illustrate mounting clips 190A and 190B having the common foot 193 structure shown in FIGS. 17-19 but with different external connector pieces 192. The external connector pieces in FIGS. 20 and 21 are offset by 90 degrees. These mounting clips 190A and 190B are designed for use with GoPro® mounting systems in an example, which is a well-known commercial mounting system, such that cover 100 can be mounted on any of the external articles noted above.

Figure 23:
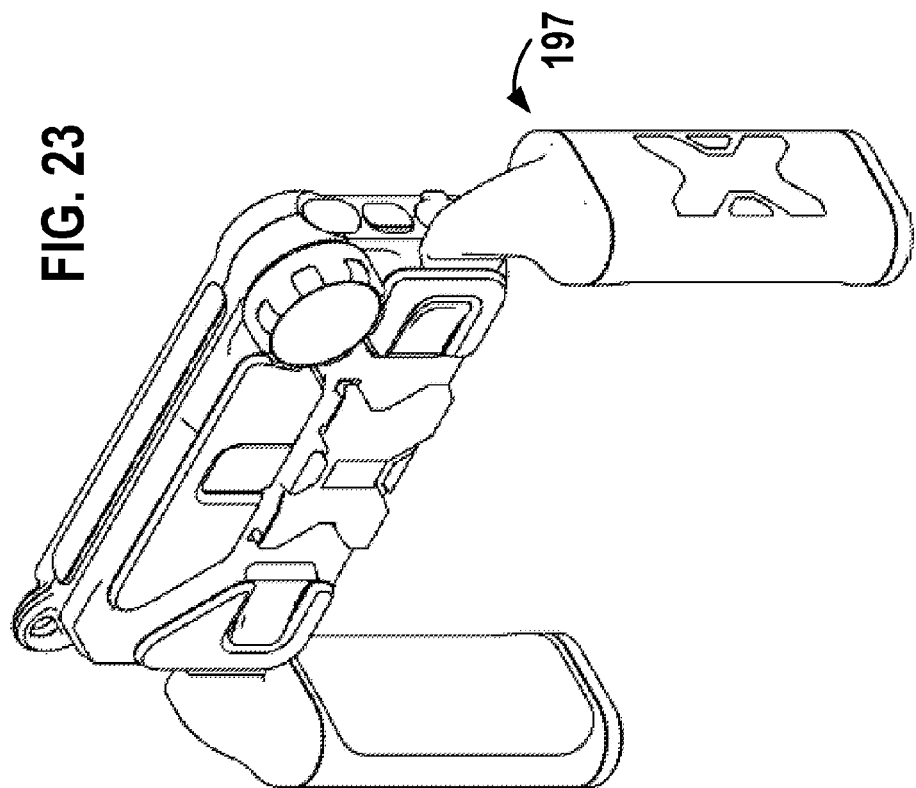
FIG. 23 is a perspective rear view of the cover showing another embodiment of video handles attached thereto.
Figure 22:
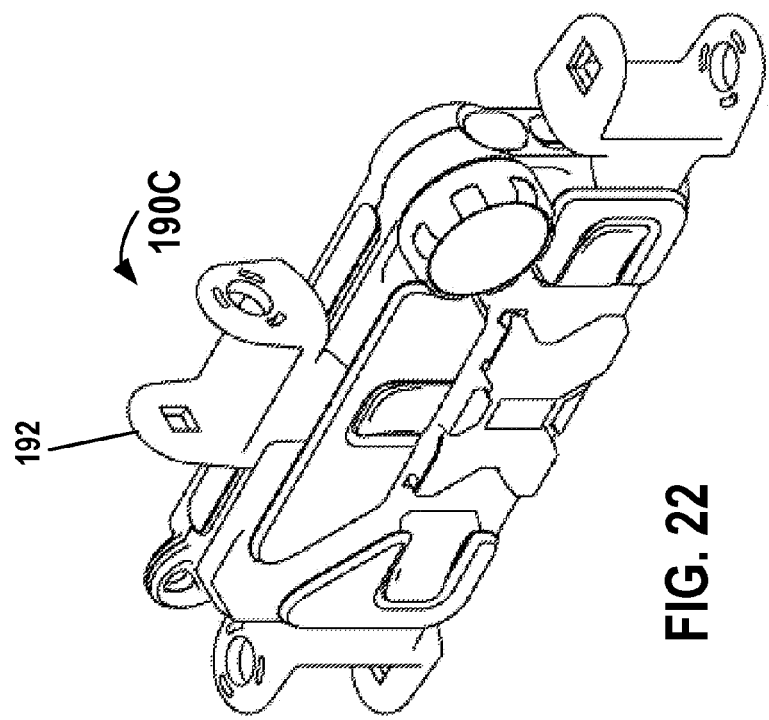
FIG. 22 is a perspective rear view of the cover showing another embodiment of mounting clips attached thereto.

FIG. 22 shows a mounting clip 190C that has the common foot structure but which is designed for use with a suction cup, one example being a Panavise® suction cup. FIG. 23 illustrates a cover 100 having a pair of handles 197 mounted thereto with the common structure of foot 193. The handles 197 enable a user to use the cover 100 with phone 150 with added stability in a camcorder-like fashion, possibly for filming or video applications with phone 150 therein. Handles 197 permits a user to fully grasp or wrap their fingers there around, and can be mounted at any one of the mounting points/mounting slots on cover 100. Each handle 197 includes a generally tubular element with the common foot structure 193 at an upper end thereof and may be composed of a plastic material with an optional rubber overmold grip.

Figure 24:
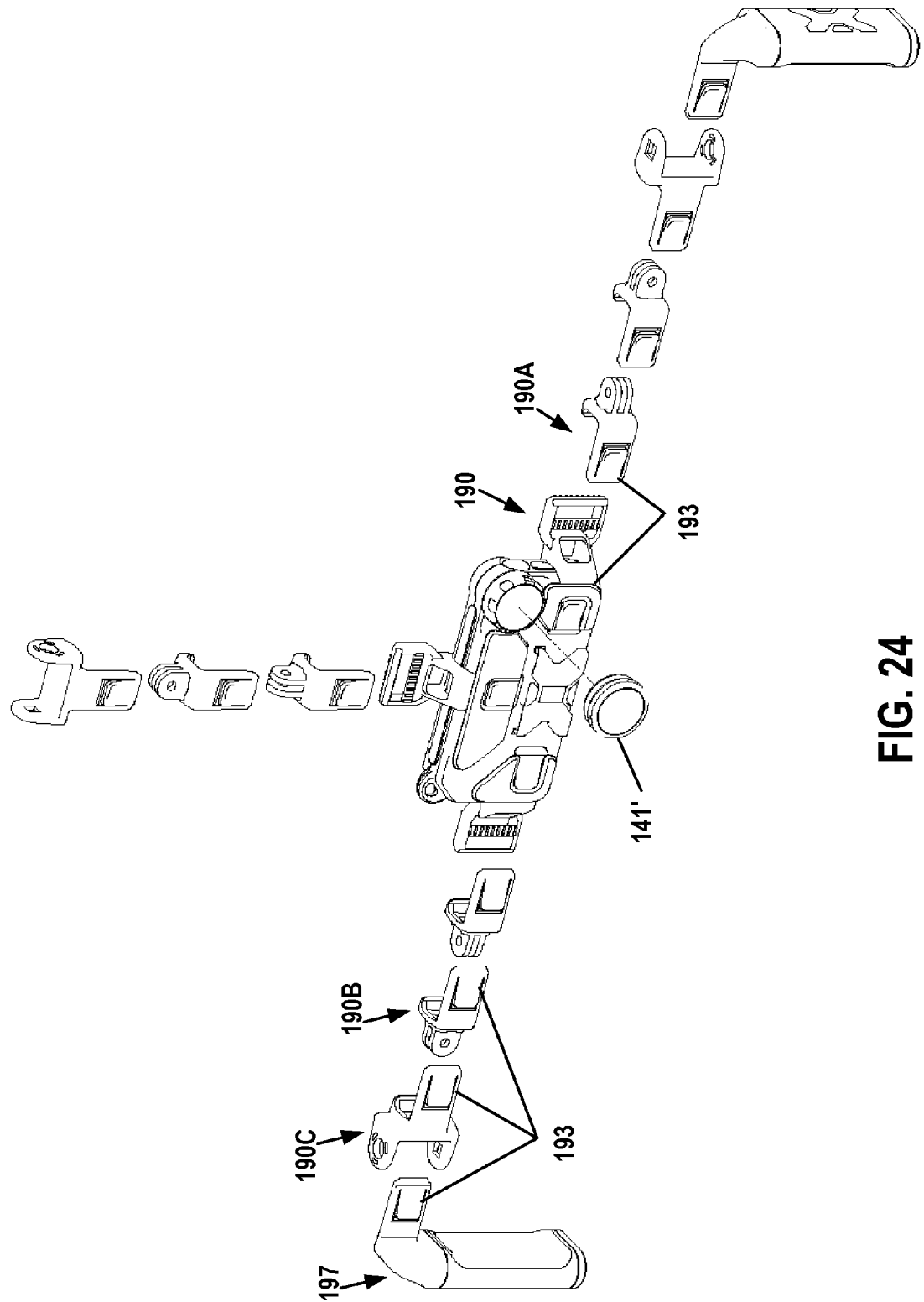
FIG. 24 is a view to illustrate the common structure at the insert ends of the clips and handles.

FIG. 24 shows a summary of several exemplary mounting clips to emphasize the common foot structure and multiple mounting points of attachment thereof on cover 100. FIG. 24 also reveals the interchangeability of lens types (see lens 141') within cover 100, depending on the viewing angle or viewing capabilities desired.

Figure 25:
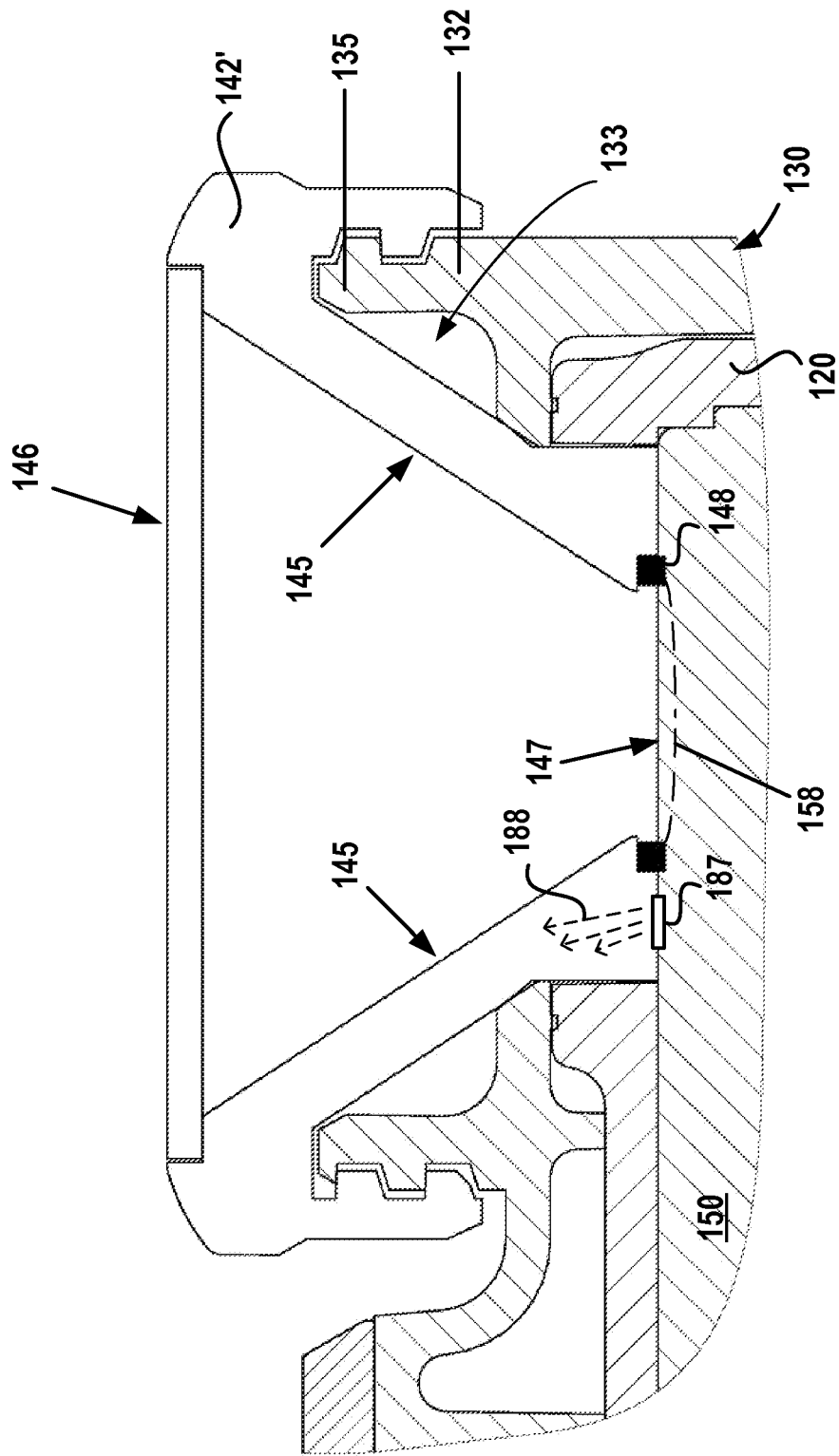
FIG. 25 is a partial sectional view of the corner of the rear casing part to illustrate a lens cap configuration according to another example embodiment.

FIG. 25 is a partial sectional view of the corner of the rear casing part to illustrate a lens cap configuration according to another example embodiment. In FIG. 25, there is shown a lens cap 142' without an enclosed lens that is secured within the aperture 133 on threads 135, so that its base 147 is adjacent lens 158. The lens cap 142' itself has a profile similar to the outer profile of a lens with a lens cap. A gasket 148 is provided at the base 147/lens 158 interface. Gasket 148 seals off a channel between the lens 158 and a flash element 188 of phone 150. A flash element is typically adjacent a camera lens in a smart phone, as shown in FIG. 25.

In one example, cap 142' may be of molded clear construction but includes interior surfaces 145 thereof painted black matte so that lens 142' acts as a light pipe/tube, in that it would transmit light 189 from the flash 188 through the camera lens 158 to the subject, but prevent the flash light 189 from reflecting back into the phone lens 158. Accordingly, the "flash" cap 142''s clear construction functions as a light pipe, and its interior painted surfaces 145 mitigate light pollution, with light 189 from the flash 188 imparted by a camera function in phone 150 (such as via lens 158) exiting from the rim 146 of the cap 142'.

In an alternative embodiment not shown in FIG. 25, lens cap 142' could be constructed of two parts. For example, lens cap 142' could comprise an outer body secured within corner aperture 133, as shown. Within its interior or adjacent the outer body so as to encircle or encompass flash element 188, there could be attached a separate light tube (not shown). Accordingly, a lens cap with dedicated light tube would act to mitigate light pollution from a flash imparted by the camera function of phone 150, typically via lens 158 in an example.

The example embodiments being thus described, it will be obvious that the same may be varied in many ways. Such variations are not to be regarded as departure from the example embodiments, and all such modifications as would be obvious to one skilled in the art are intended to be included in the following claims.

What is claimed:

1. A protective cover for an electronic device, the electronic device including ports, actuation buttons and a camera lens on a surface thereof, the cover comprising:
    a front casing,
    an elastomeric boot configured for placement around a portion of the electronic device so as to serve as a water-resistant and dust-resistant barrier to protect the ports and selected ones of the actuations buttons, the boot including an aperture therein which aligns with the camera lens of the electronic device in the boot,
    a rear casing removably coupled to the front casing so as to substantially enclose the boot with electronic device therebetween, the rear casing including a generally circular lens holder that is integrally formed as part of the rear casing, the lens holder having a circular wall portion protruding outward from an outer surface of the rear casing so as to define a recessed corner aperture therein which extends back into the lens holder and which aligns with the boot aperture and the camera lens, the recessed corner aperture including a circular o-ring attached therein, the protruding wall portion of the lens holder having a plurality of external threads around an outer surface thereof, and
    a lens assembly removably attached within the recessed corner aperture of the lens holder to extend the viewing capabilities of the camera lens of the electronic device enclosed within the protective cover, wherein the lens assembly includes a lens, a rear portion of which is captured in the recessed corner aperture of the lens holder and sealed by the o-ring, and includes a circular, removable lens cap for the lens, the lens cap having internal threads which are configured to engage the external threads on the protruding wall portion of the lens holder.

2. The cover of claim 1, the electronic device further including a touch screen, the cover further including a protective film beneath the front casing to enable use of the touch screen within the cover.

3. The cover of claim 1, wherein the front casing further includes mesh screening having waterproof and dust proof properties affixed on an interior surface thereof to seal microphone and speakers on the electronic device.

4. The cover of claim 1, wherein the rear casing includes at least two distinct mounting points in spaced relation, each mounting point configured to receive a mounting clip.

5. The cover of claim 4, wherein each mounting point comprises a channel in the rear casing that is overlain by a plate so as to form a slot for receiving a foot of a mounting clip, each plate having a cutout therein for access to release the foot from the slot.

6. The cover of claim 5, wherein each foot includes a flexible tongue with a catch on an underside thereof that snap-fit engages to the cutout of a corresponding plate when the foot of the clip is inserted into a corresponding slot.

7. The cover of claim 1, wherein
    the actuation buttons of the electronic device include at least a power button and volume control buttons and the ports include at least a mini-jack port for headphone use and a charger port, and
    the boot includes control pads which seal the power and volume control buttons while permitting use thereof with the electronic device enclosed in the cover, a pivotable flap that seals the mini-jack port but permits use thereof with the electronic device enclosed in the cover, and a hinged insert that seals the charger port within the cover and permits charging once the boot with electronic device is removed from the cover.

8. The cover of claim 1, further comprising a loop attached at a corner thereto.

9. The cover of claim 1, wherein the electronic device is embodied as a smart phone.

10. The cover of claim 1, further comprising a kickstand pivotable in a direction outward from the rear casing to support the cover thereon.

11. A protective cover for an electronic device, the electronic device including ports, actuation buttons and a camera lens on a surface thereof, the cover comprising:
    a front casing,
    a rear casing removably coupled to the front casing so as to substantially enclose the electronic device therebetween in a water-resistant, dust-resistant environment, the rear casing including a plurality of mounting slots in spaced relation thereon, each mounting slot configured to receive a mounting clip therein to attach the cover with electronic device to an external article, the rear casing including a generally circular lens holder that is integrally formed as part of the rear casing, the lens holder having a circular wall portion protruding outward from an outer surface of the rear casing so as to define a recessed corner aperture therein which extends back into the lens holder and which aligns with the camera lens, the recessed corner aperture including a circular o-ring attached therein, the protruding wall portion of the lens holder having a plurality of external threads around an outer surface thereof, and
    a lens assembly removably attached within the recessed corner aperture of the rear lens holder to extend the viewing capabilities of the camera lens of the electronic device enclosed within the protective cover, wherein the lens assembly includes a lens, a rear portion of which is captured in the recessed corner aperture of the lens holder and sealed by the o-ring, and includes a circular, removable lens cap for the lens, the lens cap having internal threads which are configured to engage the external threads on the protruding wall portion of the lens holder.

12. The cover of claim 11, wherein the rear casing includes a plurality of channels formed in, and a plurality of plates attached on, an outer surface thereof, each channel in the rear casing outer surface overlain by a plate so as to form a mounting slot, the mounting slots in spaced relation thereto, each mounting slot adapted to receive a foot of a mounting clip, each plate further including a cutout therein for access to release the foot from the formed mounting slot.

13. The cover of claim 12, wherein each foot includes a flexible tongue with a catch on an underside thereof that snap-fit engages to the cutout of a corresponding plate when the foot of the clip is inserted into a corresponding mounting slot.

14. The cover of claim 11, wherein a mounting clip for attachment of the cover with electronic device to any external article has a common foot structure for insertion into the mounting slots on the rear casing.

15. The cover of claim 11, wherein the lens cap is configured to secure multiple lens types therein to modify the viewing angle of the camera lens of the electronic device.

16. The cover of claim 11, the electronic device further including a touch screen, the cover further including a protective film beneath the front casing to enable use of the touch screen within the cover.

17. The cover of claim 11, wherein the front casing further includes mesh screening having waterproof and dust proof properties affixed on an interior surface thereof to seal microphone and speakers on the electronic device.

18. The cover of claim 11, further comprising:
an elastomeric boot configured for placement around a portion of the electronic device so as to serve as a water-resistant and dust-resistant barrier to protect the ports and selected ones of the actuations buttons, the boot including an aperture therein which aligns with the camera lens of the electronic device in the boot and the recessed corner aperture within the lens holder of the rear casing, a substantial portion of the boot with device enclosed within the front and rear casings of the cover.

19. A protective cover for an electronic device, the electronic device including at least ports, actuation buttons and a camera lens on a surface thereof, the cover comprising:
a front casing,
a rear casing removably coupled to the front casing so as to substantially enclose the electronic device therebetween in a water-resistant, dust-proof environment, the rear casing including a generally circular lens holder that is integrally formed as part of the rear casing, the lens holder having a circular wall portion protruding outward from an outer surface of the rear casing so as to define a recessed corner aperture therein which extends back into the lens holder and which aligns with the camera lens, the protruding wall portion of the lens holder having a plurality of external threads around an outer surface thereof, and
a lens cap configured in a generally frusto-conical shape with a larger diameter front circular face, bounded by a vertical overhang portion arranged around a circumference thereof which has threads on an internal surface thereof, the lens cap including a smaller diameter rear base, the threads of the lens cap configured to engage the external threads on the protruding wall portion of the lens holder to secure the lens cap to the lens holder, with the rear base of the lens cap extending into the recessed corner aperture so as to be adjacent the camera lens of the electronic device, the lens cap interior configured to mitigate light pollution from any flash exiting from the electronic device in conjunction with a camera function thereof.

20. The cover of claim 19, wherein the lens cap includes painted interior surfaces functioning as a light tube to mitigate light pollution from a flash imparted by the electronic device.

21. The cover of claim 19, wherein the lens cap includes a lens body secured within the corner aperture and a separate light tube attached within an interior thereof to mitigate light pollution from a flash imparted by the electronic device.

22. The cover of claim 19, further comprising:
an elastomeric boot configured for placement around a portion of the electronic device so as to serve as a water-resistant and dustproof barrier to protect the ports and selected ones of the actuations buttons, the boot including an aperture therein which aligns with the camera lens of the electronic device in the boot and recessed corner aperture in the lens holder of the rear casing.

23. The cover of claim 19, wherein the front casing further includes mesh screening having waterproof and dust proof properties affixed on an interior surface thereof to seal microphone and speakers on the electronic device.

24. The cover of claim 19, wherein the rear casing includes a plurality of mounting slots in spaced relation thereon, each mounting slot configured to receive a mounting clip therein to attach the cover with electronic device to an external article.

* * * * *